(12) United States Patent
Penney et al.

(10) Patent No.: US 11,007,698 B2
(45) Date of Patent: May 18, 2021

(54) RUFFLE MAKER

(71) Applicant: Hasbro, Inc., Pawtucket, RI (US)

(72) Inventors: Jill Renee Penney, Pawtucket, RI (US); Roger Paul Cazeault, Jr., North Scituate, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 16/851,596

(22) Filed: Apr. 17, 2020

(65) Prior Publication Data
US 2020/0338800 A1     Oct. 29, 2020

Related U.S. Application Data

(60) Provisional application No. 62/838,806, filed on Apr. 25, 2019.

(51) Int. Cl.
*B29C 48/25* (2019.01)
*B29C 48/30* (2019.01)
(Continued)

(52) U.S. Cl.
CPC ............ *B29C 48/13* (2019.02); *B29C 48/002* (2019.02); *B29C 48/02* (2019.02); *B29C 48/30* (2019.02); *B29C 48/475* (2019.02); *B29C 48/25* (2019.02)

(58) Field of Classification Search
CPC ... B29C 48/0019; B29C 48/002; B29C 48/02; B29C 48/25; B29C 48/30
(Continued)

(56) References Cited

U.S. PATENT DOCUMENTS 2,522,632 A     9/1950    Nicoli
2,555,409 A  *  6/1951    Hosfield .............. B29C 66/21
                                                    428/181
(Continued)

FOREIGN PATENT DOCUMENTS

JP           2006115942 A     5/2006
KR   20-2010-0009951 U       10/2010
(Continued)

OTHER PUBLICATIONS

Bahng Seung Hoon, Korean Intellectual Property Office, International Search Report and Written Opinion, corresponding PCT Application No. PCT/US2020/028684, dated Aug. 11, 2020, 10 pages total.
(Continued)

*Primary Examiner* — James P Mackey
(74) *Attorney, Agent, or Firm* — DiBerardino McGovern IP Group LLC

(57) ABSTRACT

An apparatus for forming a ruffled moldable material includes: a body including an interior space and an extrusion opening that passes through from the interior space to an exterior of the body; and a ruffle formation structure that at least partially covers the extrusion opening, the ruffle formation structure including: a first side; a second side opposite the first side; a first edge attached to the body; and a second edge. In operational use, extruded moldable material is emitted from the extrusion opening along an extrusion direction, and the extruded moldable material interacts with the ruffle formation structure to form the ruffled moldable material by compressing at least some of the extruded moldable material along the extrusion direction.

20 Claims, 18 Drawing Sheets

(51) Int. Cl.
 *B29C 48/13* (2019.01)
 *B29C 48/475* (2019.01)
 *B29C 48/02* (2019.01)
 *B29C 48/00* (2019.01)

(58) Field of Classification Search
 USPC .................................. 425/325, 476.1, 380
 See application file for complete search history.

(56) References Cited

U.S. PATENT DOCUMENTS

| | | | |
|---|---|---|---|
| 2,622,358 A * | 12/1952 | Reeves | B29C 48/03 |
| | | | 428/21 |
| 2,723,424 A * | 11/1955 | Veit | B29C 48/13 |
| | | | 425/325 |
| 3,640,312 A * | 2/1972 | Bauman | B29C 48/0015 |
| | | | 138/121 |
| 3,862,818 A | 1/1975 | Atwood | |
| 4,166,136 A | 8/1979 | Stoll | |
| 4,289,470 A | 9/1981 | Johnston et al. | |
| 4,290,989 A | 9/1981 | Topor et al. | |
| 4,305,704 A * | 12/1981 | Lemelson | B29C 59/021 |
| | | | 425/296 |
| 4,623,545 A | 11/1986 | Pivonka | |
| 4,917,590 A | 4/1990 | Svengren et al. | |
| 5,028,466 A * | 7/1991 | Trotignon | B29C 48/302 |
| | | | 428/36.91 |
| 5,219,588 A | 6/1993 | England et al. | |
| 5,401,454 A | 3/1995 | Mendel | |
| 5,443,379 A | 8/1995 | Hsu et al. | |
| 5,786,016 A | 7/1998 | Campbell et al. | |
| 5,863,566 A | 1/1999 | Wood et al. | |
| 6,382,952 B1 | 5/2002 | Cummins et al. | |
| 7,527,492 B2 | 5/2009 | Fortes | |
| 8,668,486 B2 | 3/2014 | Narwankar et al. | |
| 10,188,118 B2 | 1/2019 | O | |
| 2006/0017198 A1 | 1/2006 | Koehl | |
| 2012/0040078 A1 | 2/2012 | Narwankar et al. | |

FOREIGN PATENT DOCUMENTS

| | | |
|---|---|---|
| KR | 10-2014-0144649 A | 12/2014 |
| KR | 20-2017-0003105 U | 9/2017 |

OTHER PUBLICATIONS

Pillsbury Shape™ Sugar Cookies, obtained Apr. 15, 2019.
Play-Doh Kitchen Creations Ultimate Swirl Ice Cream Maker, available at www.amazon.com/Play-Doh-Kitchen-Creations-Ultimate-Multi-Colour/dp/B079VSJDZQ, last visited Apr. 17, 2020.

* cited by examiner

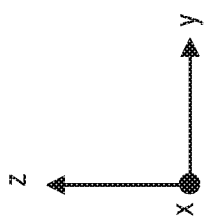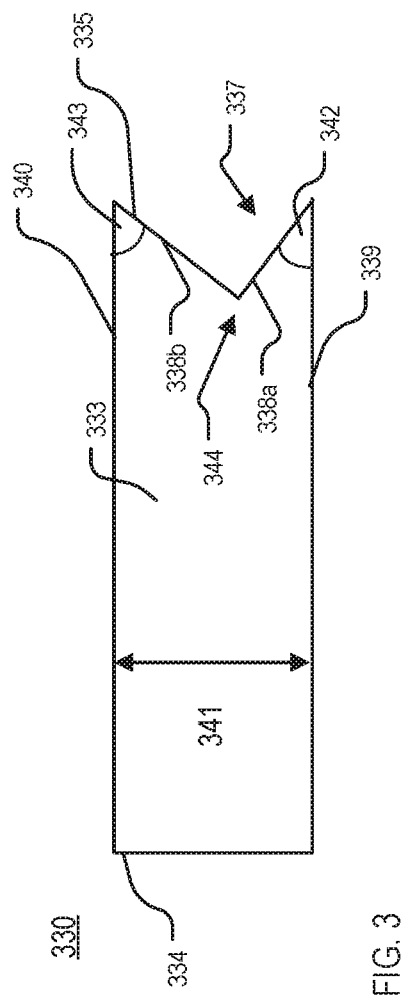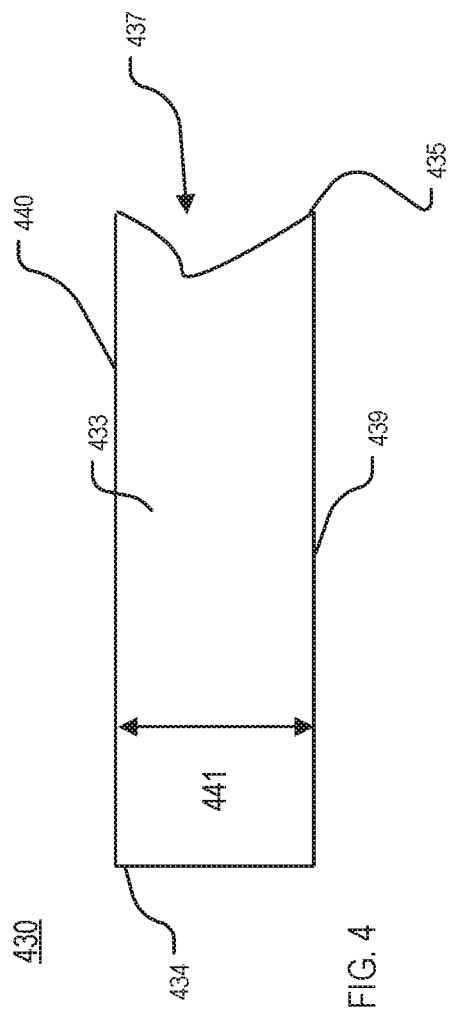

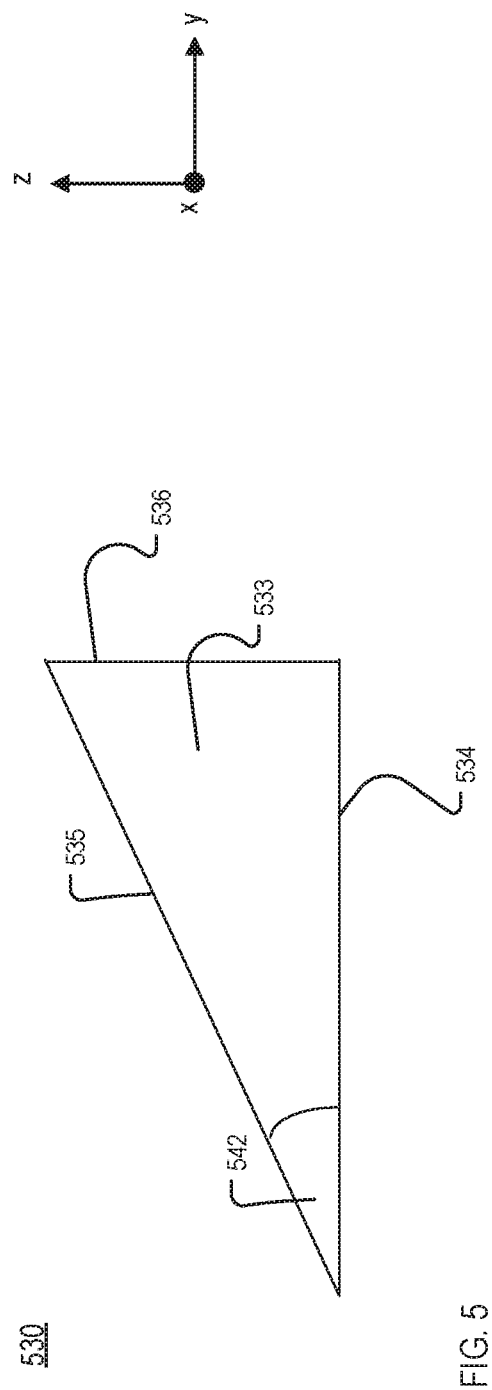

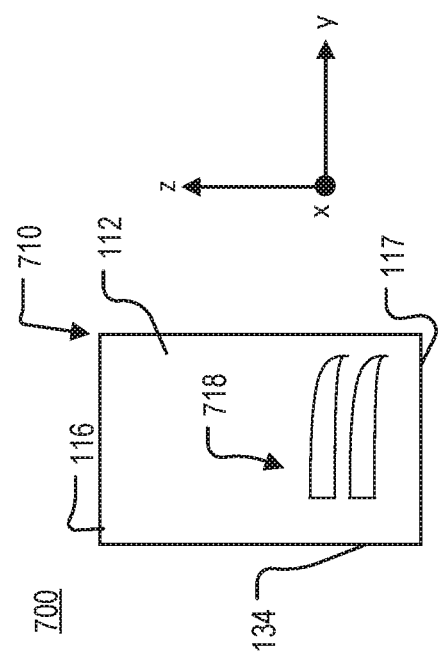

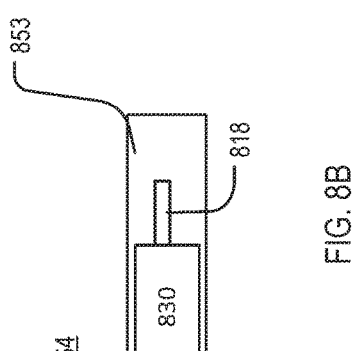
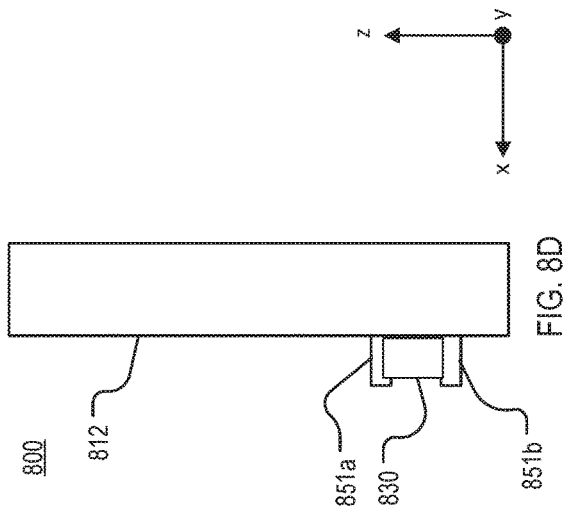
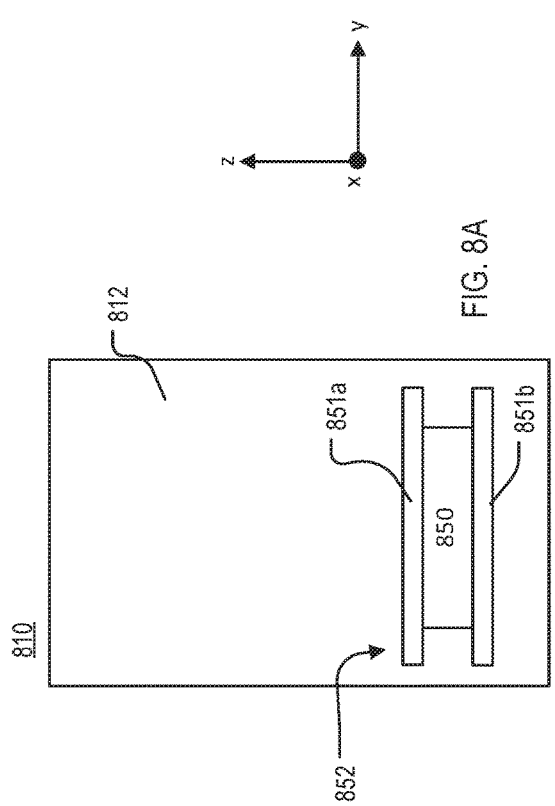
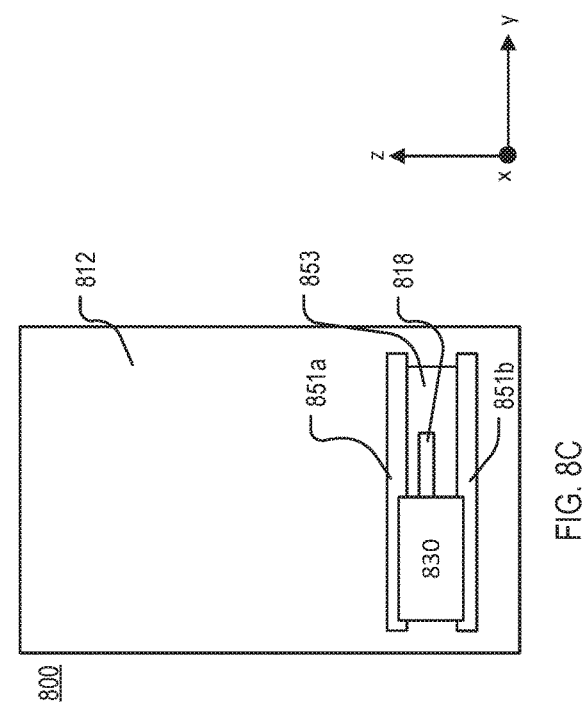

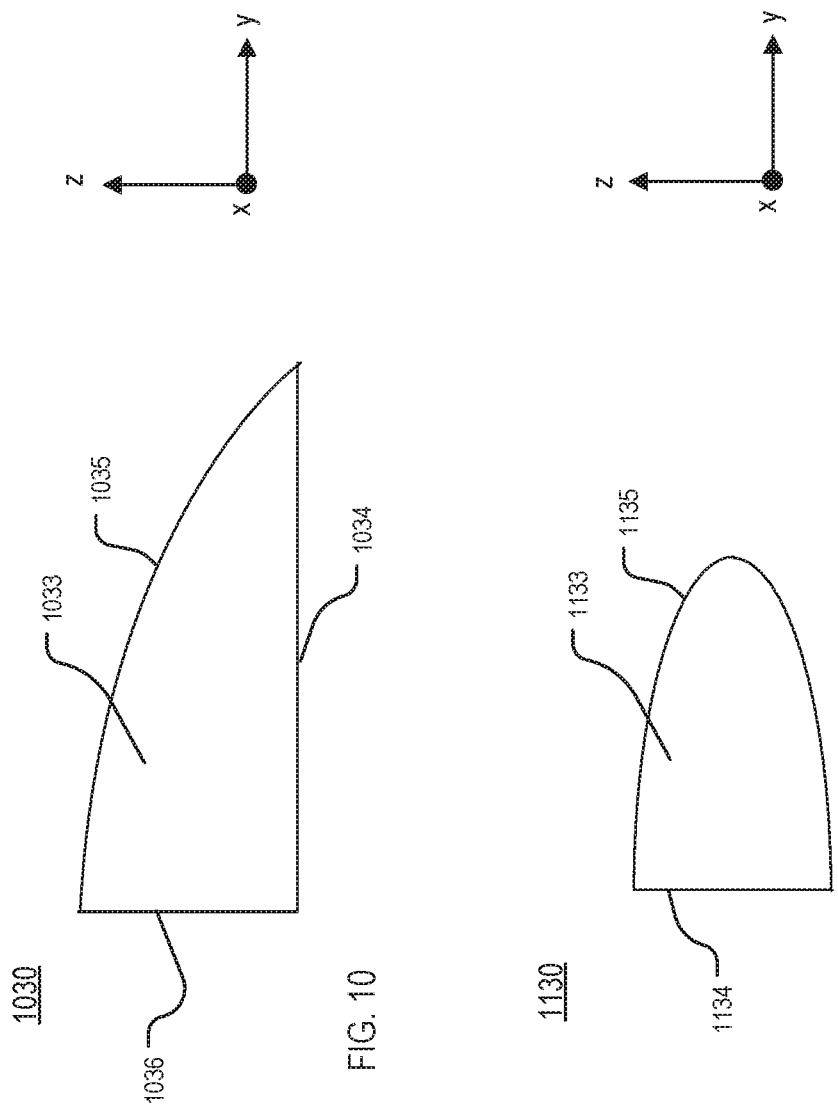

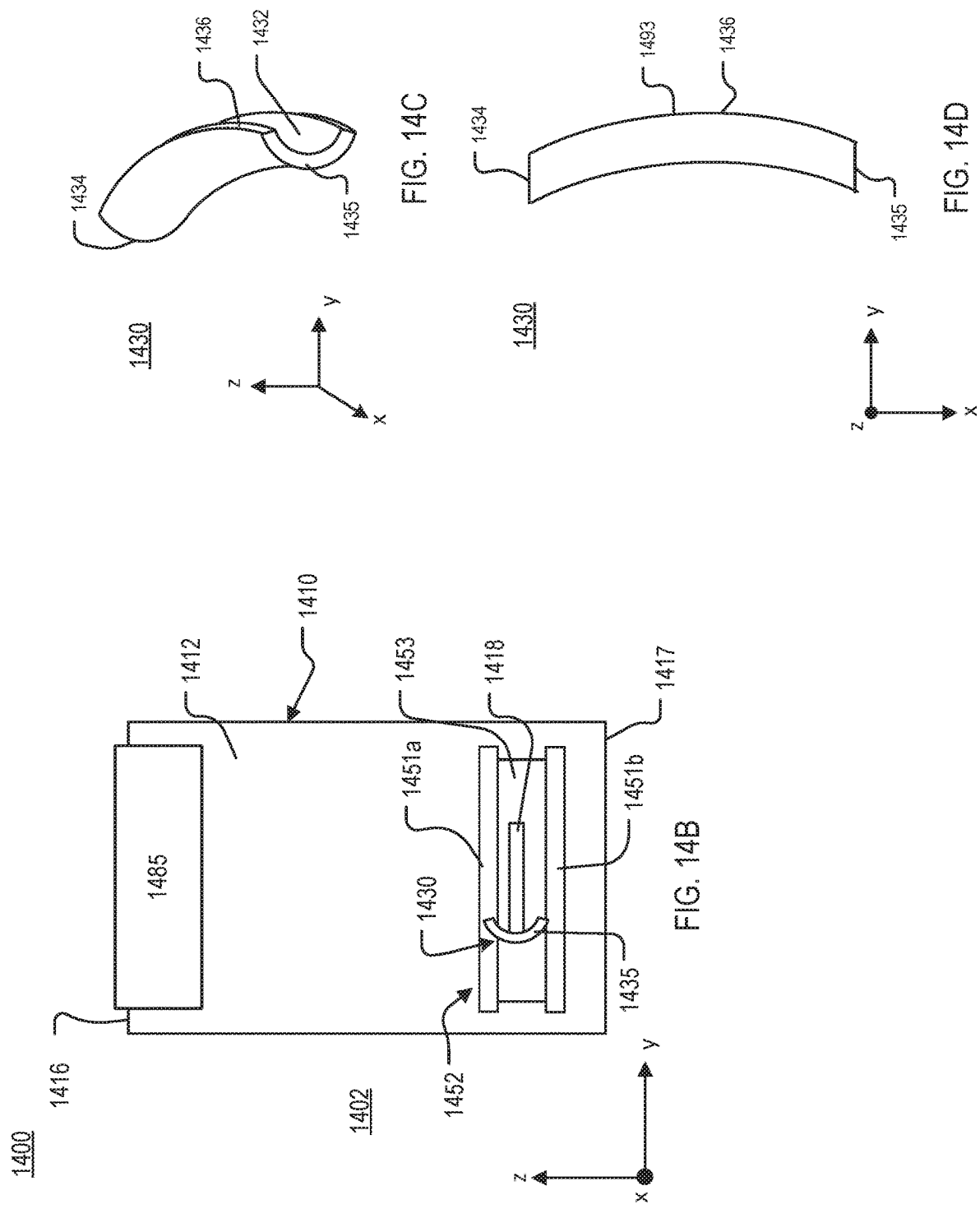

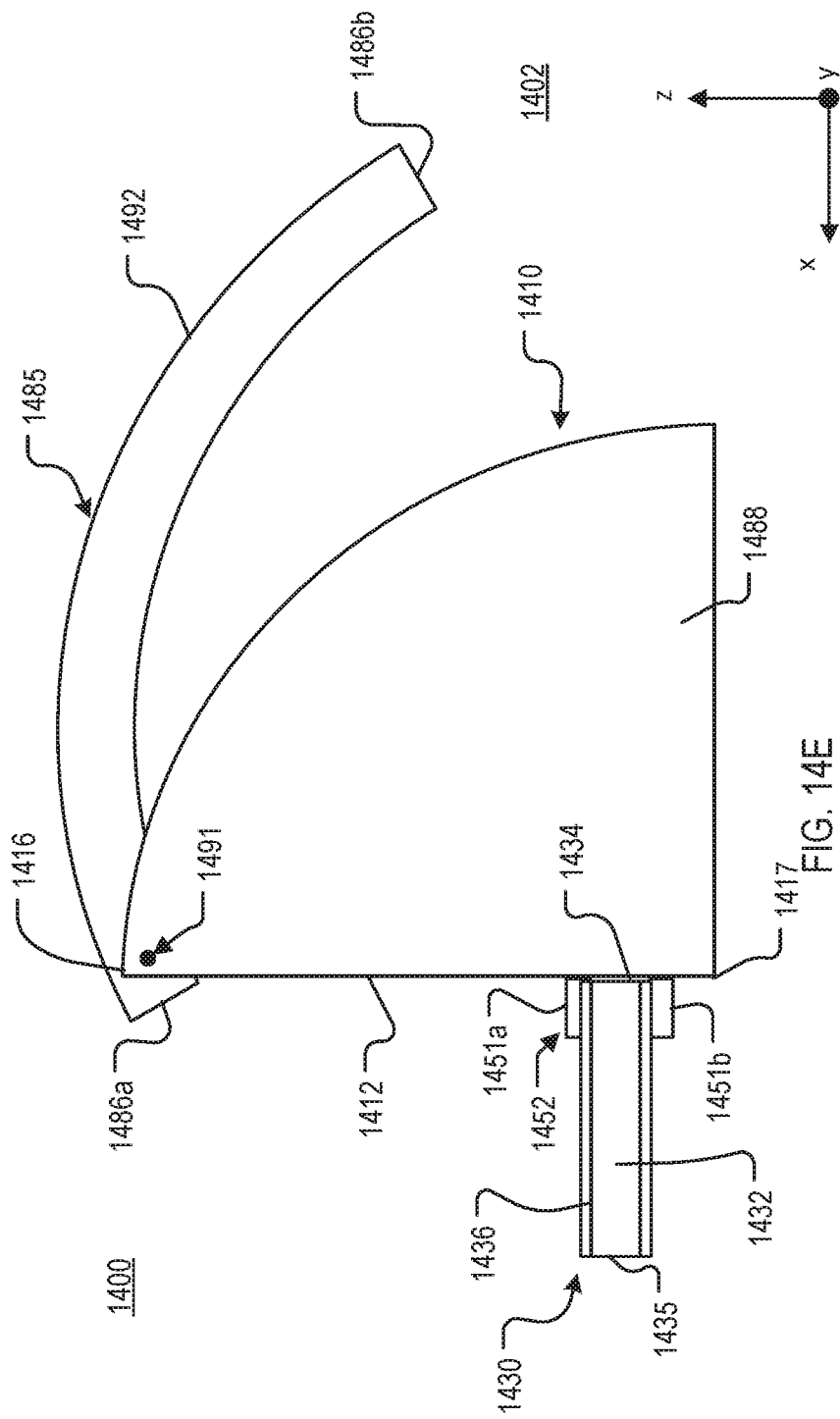

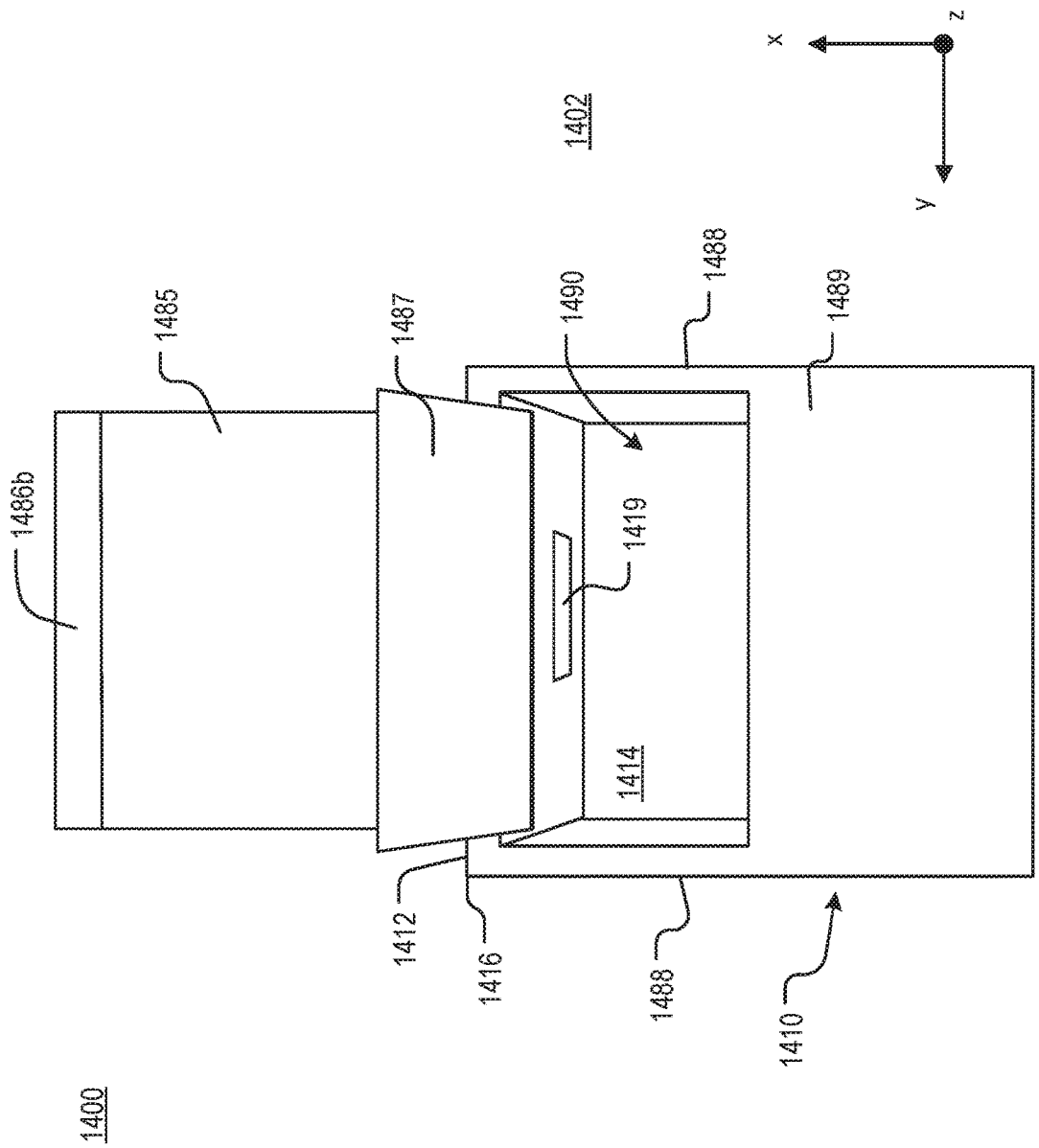

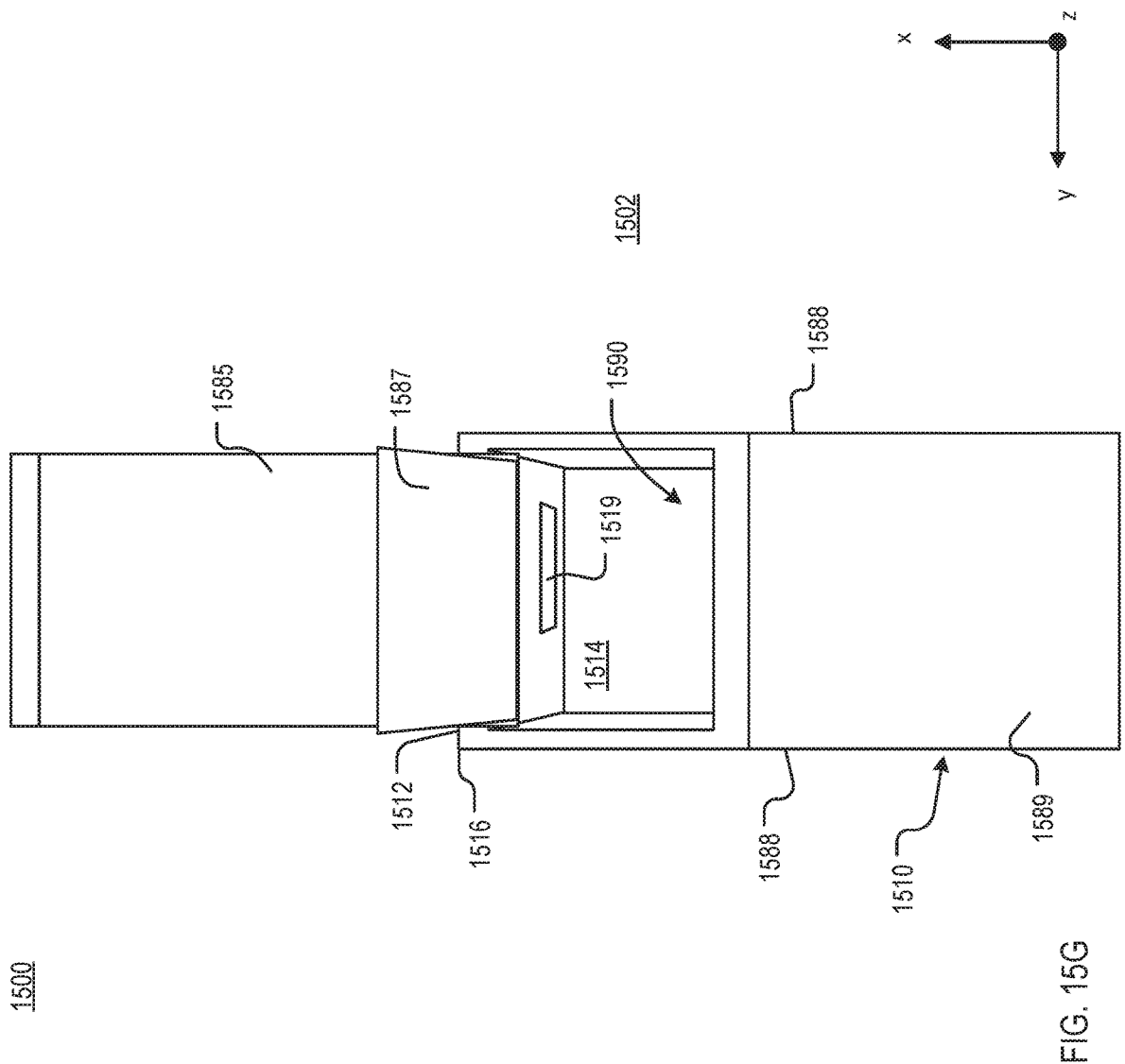

RUFFLE MAKER

CROSS-REFERENCE TO RELATED APPLICATION

This application claims the benefit of U.S. Provisional Application No. 62/838,806, filed on Apr. 25, 2019 and titled RUFFLE MAKER, which is incorporated herein by reference in its entirety.

TECHNICAL FIELD

This disclosure relates to a ruffle maker. The ruffle maker is used to form a ruffled moldable material from an extruded moldable material.

BACKGROUND

Persons of all ages enjoy playing and interacting with toys, and a moldable material is a type of toy.

SUMMARY

In one aspect, an apparatus for forming a ruffled moldable material includes: a body including an interior space and an extrusion opening that passes through from the interior space to an exterior of the body; and a ruffle formation structure that at least partially covers the extrusion opening, the ruffle formation structure including: a first side; a second side opposite the first side; a first edge attached to the body; and a second edge. In operational use, extruded moldable material is emitted from the extrusion opening along an extrusion direction, and the extruded moldable material interacts with the ruffle formation structure to form the ruffled moldable material by compressing at least some of the extruded moldable material along the extrusion direction.

Implementations may include one or more of the following features. In operational use, the extruded moldable material may interact with the second edge and the first side of the ruffle formation structure.

The second edge of the ruffle formation structure may move relative to the extrusion opening when the extruded moldable material interacts with the second edge of the ruffle formation structure. The second edge of the ruffle formation structure may move toward and away from the extrusion opening. The ruffle formation structure may include a solid material that is flexible. In some implementations, the ruffle formation structure is a solid material that is rigid and does not move relative to the body.

The second edge may define a path that includes more than one linear segment. The path may include two connected linear segments that meet at a point along the path and define an angle at the point. The ruffle formation structure also may include a third edge and a fourth edge, the first edge and the second edge extend between the third edge and the fourth edge. The point along the path may be midway between the third edge and the fourth edge. The angle may be an acute angle.

In some implementations, the second edge defines a path that includes at least one segment that is non-linear.

The apparatus also may include a pressing device configured to apply pressure to moldable material received in the interior space.

The first edge may be attached to the body such that a space is between the extrusion opening and the first side of the ruffle formation structure.

The second edge of the ruffle formation structure may be further configured to carve or scrape the extruded moldable material.

The second edge may be opposite the first edge.

The ruffled moldable material may be formed without moving the body.

The extrusion opening may extend in a first plane, the first edge that is attached to the body may extend in a second plane that is substantially parallel to the first plane, and the extrusion direction may be perpendicular to the first plane.

In another aspect, a method of forming a ruffled moldable material includes extruding a moldable material from an extrusion opening along an extrusion direction to form an extruded moldable material, the extruded moldable material having a first geometric distribution and a first extent along the extrusion direction; and forming the ruffled moldable material by interacting the extruded moldable material with a ruffle formation structure, the interaction including: pressing the extruded moldable material into a first side of a ruffle formation structure attached at a first edge to a body that defines the extrusion opening such that the extruded moldable material makes physical contact with a second edge of the ruffle formation structure while moving relative to the second edge to thereby form the ruffled moldable material, the ruffled moldable material having a second geometric distribution that includes substantially the same amount of moldable material as the first geometric distribution and a smaller extent in the extrusion direction.

In another aspect, a ruffle formation apparatus for use with a toy moldable compound includes a body including an extrusion opening that passes from an interior of the body to an exterior of the body; and a ruffle formation structure attached to an exterior of the body and partially covering the extrusion opening.

Implementations of any of the techniques described above can include a toy set, a ruffle maker, and/or a method. The details of one or more implementations are set forth in the accompanying drawings and the description below. Other features will be apparent from the description and drawings, and from the claims.

DRAWING DESCRIPTION

FIGS. 3-5 are examples of ruffle formation structures.

FIG. 7 is a front elevation view of an example of a body that may be part of an apparatus.

FIG. 8A is a block diagram of an example of a body and a mounting structure.

FIG. 8B is a block diagram of an example of a ruffle formation assembly.

FIG. 8C is a block diagram of an assembled ruffle formation apparatus.

FIG. 8D is a side block diagram of the assembled ruffle formation apparatus of FIG. 8C.

FIGS. 10-13 show examples of other ruffle formation structures.

FIG. 14B is a front view of the ruffle formation apparatus of FIG. 14A.

FIG. 14C is a perspective view of a ruffle formation structure.

FIG. 14D is a top view of the ruffle formation structure of FIG. 14C.

FIG. 14E is a side view of the ruffle formation apparatus of FIG. 14A.

FIG. 14F is a top view of the ruffle formation apparatus of FIG. 14A.

FIG. 15G is a top view of the ruffle formation apparatus of FIG. 15A.

DESCRIPTION

Figure 1A:
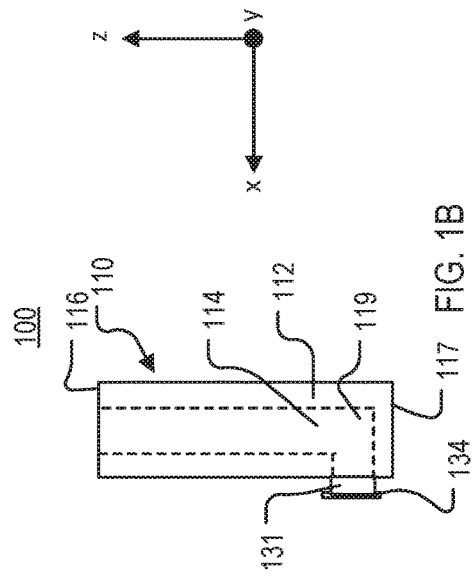
FIG. 1A is a front elevation view of an example of an apparatus.
Figure 1B:
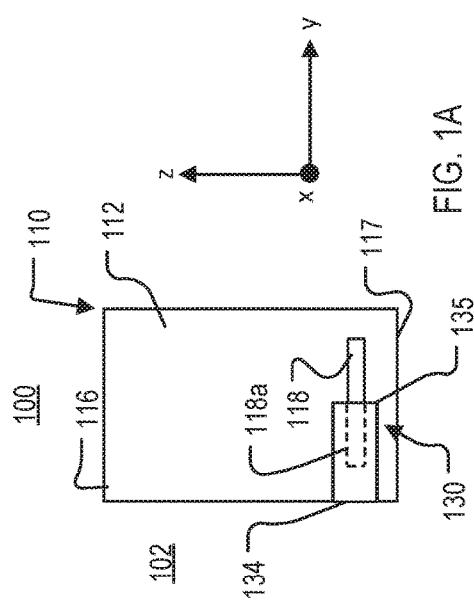
FIG. 1B is a left side elevation view of the apparatus of FIG. 1A.
Figure 1C:
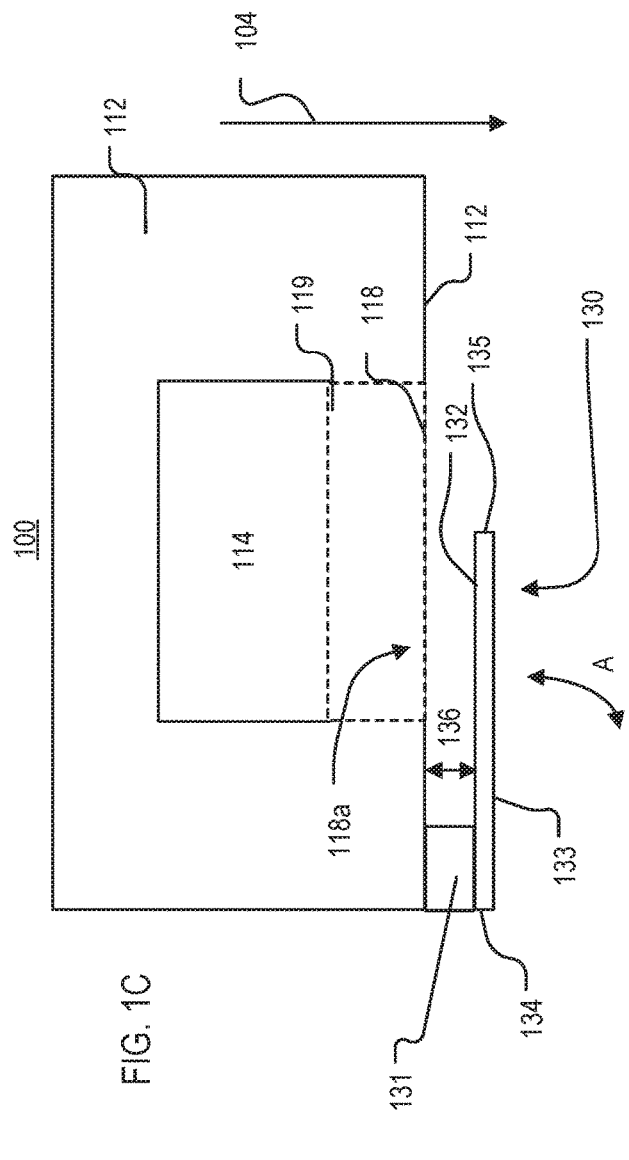
FIG. 1C is a top plan view of the apparatus of FIG. 1A.

Referring to FIGS. 1A-1C, an example of an apparatus 100 is shown. The apparatus 100 is an apparatus for forming a ruffled moldable material. The moldable material may be any type of material that is capable of being shaped and capable of holding a shape. For example, the moldable material may be putty, clay, and/or a dough substance (for example, PLAY-DOH®, available from Hasbro, Inc. of Pawtucket, R.I.). The apparatus 100 also may be referred to as a ruffle formation apparatus 100. The apparatus 100 may be part of a toy set, such as the toy set 970 of FIG. 9.

The configuration of the apparatus 100 allows a user to form a ruffled moldable material easily by simply applying pressure to the moldable material and without having to rely on the user's skill. For example, the apparatus 100 does not require that the user perform intricate and delicate movements of the apparatus 100 to make the moldable material ruffle. Instead, the moldable material ruffles through an interaction with a ruffle formation structure 130. The user does not have to move the apparatus 100 to create ruffles. For example, the user is not required to move the body 110 relative to the surface (such as a table or other object) on which the ruffles are formed. Thus, the apparatus 100 is suitable for inexperienced and/or young users.

FIG. 1A is a front elevation view of the apparatus 100 in the y-z plane. FIG. 1B is a left side elevation view of the apparatus 100 in the x-z plane. FIG. 1C is a top plan view of the apparatus 100 in the x-y plane. The apparatus 100 includes a body 110 and a ruffle formation structure 130 attached to an exterior surface 112 of the body 110. The body 110 is a three-dimensional object that extends in the z direction from an end 117 to an end 116. The body 110 is made of a solid and rugged material, such as, for example, rigid molded plastic.

The body 110 includes a passage 114 that is open to an exterior region 102 at an end 116 and at an extrusion opening 118. The extrusion opening 118 is a rectangular opening that extends in the y-z plane. The extrusion opening 118 has a width along the y direction that is greater than its height along the z direction. The passage 114 is shown with a dashed line. The passage 114 passes all the way through the body 110 such that moldable material loaded into the passage 114 at the end 116 exits the body 110 through the extrusion opening 118. The interior passage 114 has an L-shaped cross section in the x-z plane. The interior passage 114 extends from the end 116 in the −z direction toward the end 117, turns at a turning region 119, and extends from the turning region 119 along the x direction to the extrusion opening 118.

The ruffle formation structure 130 is a solid three-dimensional object that is mounted to the body 110. In the example of FIGS. 1A-1C, the ruffle formation structure 130 is a rectangular plate. The ruffle formation structure 130 includes a first side 132 and a second side 133, both of which extend in the y direction from a first edge 134 to a second edge 135.

Figure 2A:
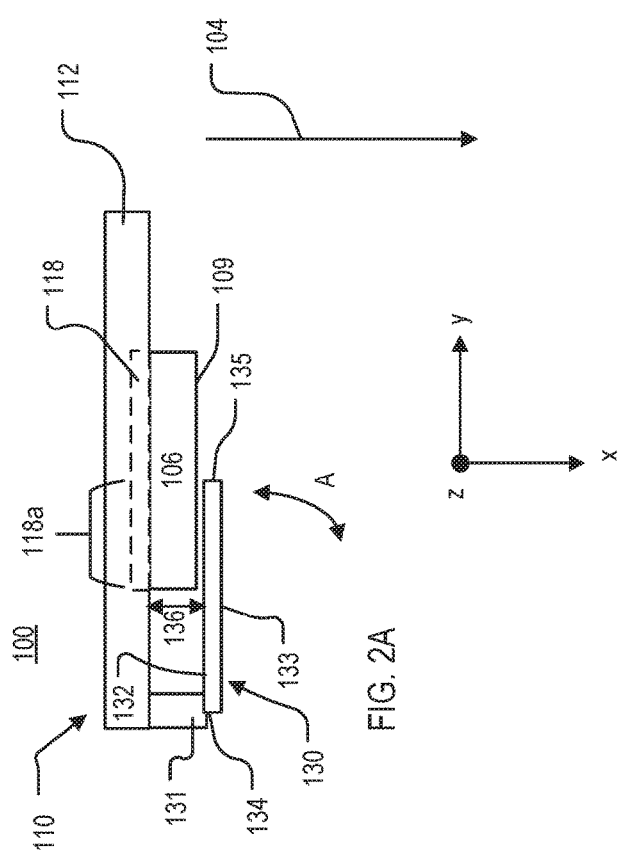
FIGS. 2A and 2B are partial top plan views of the apparatus of FIG. 1A at two different times.
Figure 2B:
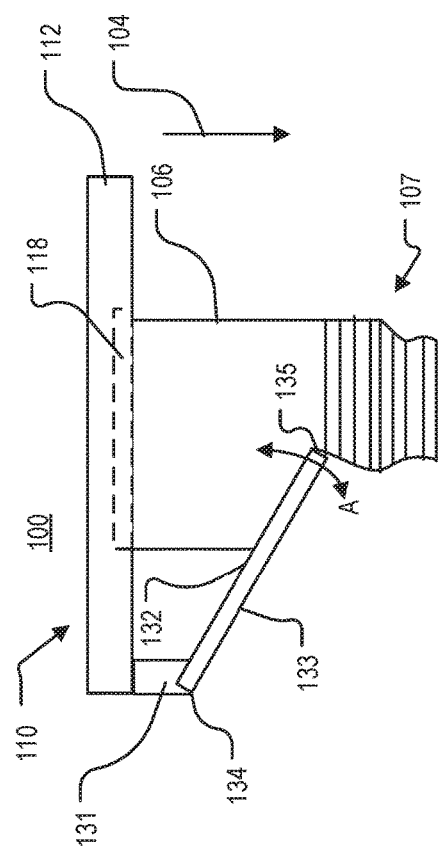

The first edge 134 of the ruffle formation structure 130 is mounted on the body 110 at a mounting point 131. The first edge 134 includes the outer perimeter portion of the ruffle formation structure 130 as well as portions of the structure 130 that are near the outer perimeter portion. Thus, the first edge 134 being mounted on the body 110 may be accomplished by mounting a region of the structure 130 that is near the outer perimeter but not exactly at the outer perimeter on the body 110. In other words, the outer perimeter of the structure 130 may or may not be attached to the body 110. Only part of the ruffle formation structure 130 is mounted to the body 110. In the example of FIGS. 1A-1C, the second edge 135 and the portions of the first and second sides 132, 133 that are not at the first edge 134 are not mounted to the body 110. The mounting point 131 may be, for example, a flexible bracket that is attached to the exterior surface 112 and holds the ruffle formation structure 130, or an adhesive bond that holds the ruffle formation structure 130 to the body 110. The mounting point 131 may hold the first edge 134 in a fixed position relative to the body 110. In some implementations, the mounting point 131 allows the edge 134 to rotate. In these implementations, the portions of the ruffle formation structure 130 that are not directly attached to the mounting point 131 may move relative to the body 110 even if the structure is a rigid material. For example, the mounting point 131 may allow the second edge 135 of the ruffle formation structure 130 to move along an arc A in the x-y plane. Moreover, the structure 130 may be made of a solid flexible material (such as a thin plastic). In these implementations, the structure 130 is able to move relative to the body 110 regardless of the configuration of the mounting point 131. Furthermore, the sharp edge 135 and its placement relative to opening 118 may scrape or carve the underneath side of an extruded moldable material 106 (as shown in FIGS. 2A and 2B). The scraping thins the extruded moldable material 106, additionally altering the spatial properties of a ruffled moldable material 107 (as shown in FIG. 2B).

In the example of FIGS. 1A-1C, the mounting point 131 holds the ruffle formation structure 130 along the z direction. However, other configurations are possible. For example the mounting point 131 may hold the ruffle formation structure 130 along the y direction. FIG. 5 shows an example of a ruffle formation structure 530 that may be held to the body 110 with the connection point oriented along the y direction.

The first side 132 faces the extrusion opening 118 and extends parallel to the extrusion opening 118 in the y-z plane. The ruffle formation structure 130 is spaced from the exterior surface 112 along the extrusion direction 104 by a distance 136. The ruffle formation structure 130 covers a portion 118a of the extrusion opening 118. By covering the portion 118a, the ruffle formation structure 130 obscures or is in front of the portion 118a when the apparatus 100 is viewed in the orientation shown in FIG. 1A. The portion 118a is shown with a dotted line in FIG. 1A to illustrate that the portion 118a is hidden by the ruffle formation structure 130 when the apparatus 100 is viewed from the front. The portion 118a is part of the extrusion opening 118 and is not a separate element. The portion 118a is labeled to illustrate that the ruffle formation structure 130 is positioned in front of, overlaps, and/or covers a part of the extrusion opening 118.

The ruffle formation structure 130 is made of any material that is capable of pressing against moldable material. For example, the ruffle formation structure 130 may be made of a flexible but durable material such as foam or polyethylene terephalate (PET). In some implementations, the ruffle formation structure 130 includes a plurality of pieces that are permanently joined together to form the structure 130. The pieces may all be the same material, or the pieces may be made of different materials. For example, the ruffle formation structure 130 may be formed from rigid plastic and flexible portions. Moreover, the first side 132 and/or the second edge 135 may be treated, coated with, or formed from a material that encourages the moldable material to form ruffles. The first side 132 and the second edge 135 are made of a material that is smooth enough to allow the moldable material to move across the first side 132 and the second edge 135 of the ruffle formation structure 130.

The distance 136 between the extrusion opening 118 and the first side 132 allows the moldable material to be extruded prior to making physical contact with the ruffle formation structure 130. The first side 132 is positioned relative to the extrusion opening 118 such that moldable material that is extruded from the opening 118 along the extrusion direction 104 makes contact with the first side 132.

FIGS. 2A and 2B are partial top plan views of the apparatus 100 at two different times. FIG. 2A shows the apparatus 100 while the moldable material is being extruded as the extruded moldable material 106. FIG. 2B shows the apparatus 100 at a time when the extruded moldable material 106 interacts with the ruffle formation structure 130 to form the ruffled moldable material 107. The ruffled moldable material 107 may be used, for example, as clothing for dolls or as decoration on a toy food item.

Referring to FIG. 2A, the moldable material that is in the passage 114 is extruded through the extrusion opening 118 to form the extruded moldable material 106. The extruded moldable material 106 leaves the body 110 along the extrusion direction 104. The extruded moldable material 106 is a single piece of the moldable material that has a cross section in the y-z plane that is substantially the same as the shape of the extrusion opening 118 in the y-z plane. At any given time during the extrusion process, the length of the extruded moldable material 106 along the extrusion direction 104 is the distance from an end 109 (which is the first part of the extruded moldable material 106 to leave the extrusion opening 118) to the extrusion opening 118. The distance from end 109 to opening 118 depends on the amount of moldable material in the passage 114 and the amount of time over which the pressure is applied to the moldable material. The length of the extruded moldable material 106 along the extrusion direction 104 increases as the amount of moldable material in the passage and the time over which the pressure is applied to the moldable material increase.

Referring to FIG. 2B, when the length of the extruded moldable material 106 is the distance 136, the extruded moldable material 106 makes physical contact with the first side 132. The extruded moldable material 106 continues to be extruded from the extrusion opening 118 and thus presses against the first side 132, and pushes against first side 132, forming an angle, for example relative to the position shown in FIG. 2B. Simultaneously, the side 132 exerts a force on the extruded moldable material 106. The force that the side 132 exerts on the extruded moldable material 106 has a component that is along a direction opposite the direction 104, and the force causes the extruded moldable material 106 to compress along the direction 104. The interaction between the ruffle formation structure 130 and the extruded moldable material 107 does not remove any of the material. Thus, the extruded moldable material 106 begins to pinch, compress, and/or gather along the direction 104. These pinches are ruffles of the moldable material. Thus, the physical interaction between the ruffle formation structure 130 and the extruded moldable material 106 forms the ruffled moldable material 107.

In addition to the pressure applied by the side 132, friction between the first side 132 and the extruded moldable material 106 also may encourage ruffle formation. For example, the extruded moldable material 106 has a stickiness or adhesive quality and/or the first side 132 is a surface to which the extruded moldable material 106 does not slide along the first side 132. As a result, although the extruded moldable material 106 may move along the first side 132, the friction causes the extruded moldable material 106 to compress and pinch along the direction 104. If the extruded moldable material 106 continues to move along the direction 104, the compressed material 107 is pushed around the second edge 135. Friction between the second edge 135 and the moldable material also enhances ruffle formation.

In the implementation of FIGS. 2A and 2B, the ruffle formation structure 130 is able to rotate about the mounting point 131 such that the edge 135 and portions of the ruffle formation structure 130 follow the arc A in the x-y plane. The ruffle formation structure 130 moves along the arc A away from the body 110 until reaching the end of the range of motion allowed by the mounting point 131. After reaching the end of the range of motion, the moldable material more easily moves around the edge 135, and the force applied by the extruded moldable material 106 applies less force to the side 132. The ruffle formation structure 130 then moves back toward the body along the arc A. The motion of the ruffle formation structure 130 also encourages ruffle formation. For example, by moving, the ruffle formation structure 130 allows the pressure that the extruded moldable material 106 applies to the ruffle formation structure 130 to build and release. The buildup of the pressure may create the gathers of material and the release of the pressure allows the moldable material to keep moving around the second edge 135 and/or along the first side 132 such that there are spaces between the gathers. The resilience of the ruffle formation structure 130 enables the structure 130 to maintain force and/or pressure against the moldable material. When the force and/or pressure are intermittently released, ruffles may be created on the extruded moldable material 106.

In the implementation shown in FIGS. 2A and 2B, the ruffle formation structure 130 moves along the arc A by rotating at the mounting point 131. Other implementations are possible. For example, the ruffle formation structure 130 may be formed from a flexible plastic material that bends and flexes when the extruded moldable material 106 applies pressure. In these implementations, the mounting point 131 holds the edge 134 in a fixed spatial relationship with the body 110, but the edge 135 and other portions of the ruffle formation structure 130 that is not directly attached to the mounting point 131 may move relative to the body 110.

Other implementations are possible. For example, although the ruffled moldable material 107 may be formed with a ruffle formation structure 130 that does not move when interacting with the extruded moldable material 106. In these implementations, the distance 136 remains constant while the extruded moldable material 106 interacts with the ruffle formation structure 130.

Furthermore, the shape of the edge 135 and the distance 136 may be varied to control the spatial properties of the ruffled moldable material 107. Each different shape of the edge 135 alters the amount and placement of pressure and friction on the extruded moldable material 106, causing the extruded moldable material 106 to pinch, compress, and/or gather in different ways. In other words, the shape of the edge 135 may be tailored to form ruffles having particular spatial properties.

The ruffle formation structure 130 may have any shape. FIGS. 3-5 show ruffle formation structures 330, 430, 530, respectively. Each ruffle formation structure 330, 430, 530 is shown in the y-z plane. Any of the ruffle formation structures 330, 430, 530 may be mounted to the body 110 at the mounting point 131. The ruffle formation structures 330, 430, 530 are examples of other configurations of the ruffle formation structure 130. Configurations other than those shown in FIGS. 3-5 are possible.

FIG. 3 shows a second side 333 of the ruffle formation structure 330. The ruffle formation structure 330 may be configured to move relative to the body 110 or may be configured to remain in a fixed spatial relationship with the body 110 even when the extruded moldable material 106 interacts with the ruffle formation structure 330. The second side 333 extends in the y direction from a first edge 334 to a second edge 335.

The perimeter of the ruffle formation structure 330 in the y-z plane is the first edge 334, a third edge 339 that extends along the y direction from the first edge 334 to the second edge 335, and a fourth edge 340 that is parallel to and separated by a distance 341 along the z direction from the third edge 339. The first edge 334, the third edge 339, and the fourth edge 340 are straight, linear segments that do not include curves.

The second edge 335 follows a V-shaped path 337 between the third edge 339 and the fourth edge 340. The path 337 has two linear segments 338a, 338b. The linear segment 338a extends from the third edge 339 at an angle 342. The linear segment 338b extends from the fourth edge 340 at an angle 343. The angles 342 and 343 are acute angles. That is, the angles 342 and 343 are less than 90 degrees (°).

The linear segments 338a and 338b meet at a point 344. In the example shown, the angles 342 and 343 are not the same, and the linear segments 338a, 338b are different lengths. Thus, the point 344 is not equidistant from the third edge 339 and the fourth edge 340. However, in some implementations, the angles 342 and 343 are the same, and the linear segments 338a, 338b are the same length. In these implementations, the point 344 is equidistant between the third edge 339 and the fourth edge 340.

The first edge 334 or a portion near the first edge 334 may be mounted to the body 110 at the mounting point 131. When the ruffle formation structure 330 is mounted to the body 110, the extruded moldable material 106 presses against a first side (not shown) opposite the second side 333. The extruded moldable material 106 is transformed into the ruffled moldable material 107 by interacting with the first side and the second edge 335. The shape of the path 337 partially determines the spatial configuration of the ruffled moldable material 107.

FIG. 4 shows a second side 433 of the ruffle formation structure 430. The ruffle formation structure 430 may be configured to move relative to the body 110 or may be configured to remain in a fixed spatial relationship with the body 110 even when the extruded moldable material 106 interacts with the ruffle formation structure 430.

The second side 433 extends in the y direction from a first edge 434 to a second edge 435. The perimeter of the ruffle formation structure 430 in the y-z plane is the first edge 434, a third edge 439 that extends along the y direction from the first edge 434 to the second edge 435, and a fourth edge 440 that is parallel to and separated by a distance 441 along the z direction from the third edge 439. The first edge 434, the third edge 439, and the fourth edge 440 are straight, linear segments that do not include curves. The path 437 includes curved segments.

The first edge 434 may be mounted to the body 110 at the mounting point 131 with the side 433 facing away from the extrusion opening 118. When the ruffle formation structure 430 is mounted to the body 110, the extruded moldable material 106 presses against first side (not shown) opposite the second side 433. The extruded moldable material 106 is transformed into the ruffled moldable material 107 by interacting with the first side and the second edge 435. The shape of the path 437 partially determines the spatial configuration of the ruffled moldable material 107.

FIG. 5 shows a second side 533 of a ruffle formation structure 530. The ruffle formation structure 530 has a generally triangular shape in the y-z plane. The ruffle formation structure includes a first edge 534 and a second edge 535, which extends from the first edge 534 at an angle 542. A third edge 536 extends from the first edge 534 to the second edge 535 along the z direction opposite to the angle 542. Together, the first edge, the second edge 535, and the third edge 536 define the perimeter of the ruffle formation structure 530.

The first edge 534 may be mounted to the body 110 with a mounting point that extends in the y direction. The ruffle formation structure 530 covers part of the extrusion opening 118 and the side 533 faces away from the extrusion opening 118. When the ruffle formation structure 530 is mounted to the body 110, the extruded moldable material 106 presses against first side (not shown) opposite the second side 533. The extruded moldable material 106 is transformed into the ruffled moldable material 107 by interacting with the first side and the second edge 535. The ruffle formation structure 530 is formed from a solid material that may move relative to the body 110. For example, the ruffle formation structure 530 may move along an arc (not shown) in the x-z plane.

The ruffle formation structures 130, 330, 430, and 530 are plate structures. However, the ruffle formation structure may take other forms.

Figure 6:
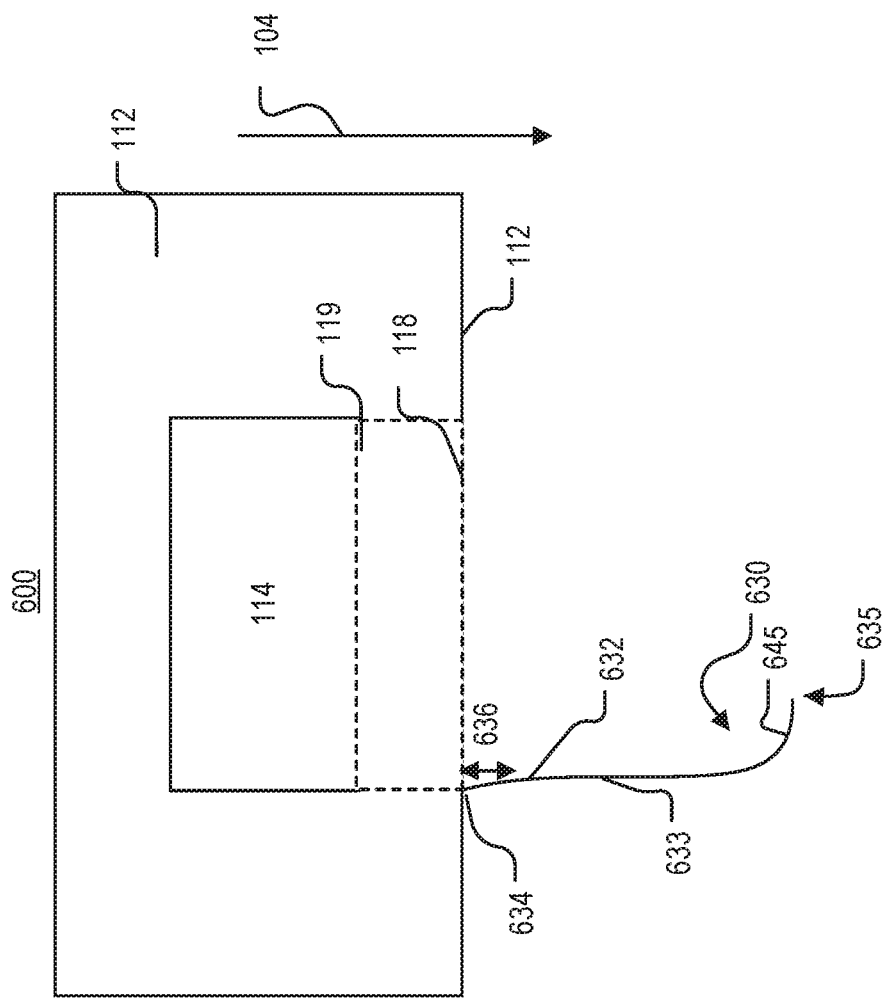
FIG. 6 is a top plan view of another example of an apparatus.

FIG. 6 is a block diagram of a top plan view of a ruffle formation apparatus 600. The ruffle formation apparatus 600 is the same as the ruffle formation apparatus 100, except the ruffle formation apparatus 600 includes a ruffle formation structure 630 instead of the structure 130. The ruffle formation structure 630 is a three-dimensional structure that includes curved segments. The ruffle formation structure 630 includes a first edge 634 and a second edge 635. The ruffle formation structure 630 extends from the first edge 634 to the second edge 635 along a curved path. The first edge 634 is attached to the exterior surface 112 of the body 110. The ruffle formation structure 630 includes a first side 632 and a second side 633. Portions of the first side 632 face the extrusion opening 118. The second side 633 does not face the extrusion opening 118.

The extruded moldable material 106 exits the extrusion opening 118 and, after being extruded to a length that is at least as long as a distance 636, the extruded moldable material 106 makes physical contact with the first side 632. Friction between the first side 632 and the extruded moldable material 106 causes the material 106 to compress and gather, forming ruffles. The extruded moldable material 106 also is gathered by pressure that builds up at a segment 645 near the edge 635 and then spills around the edge 635, forming the ruffled moldable material 107. As compared to other portions of the ruffle formation structure 630, the segment 645 is more perpendicular to the extrusion direction 104. The orientation of the segment 645 as compared to the extrusion direction 104 causes an increased amount of pressure to build up at the segment 645. This results in more compression and a tighter ruffle pattern on the ruffled moldable material 107 as compared to an implementation that uses a ruffle formation structure 130, which exerts pressure evenly across the extruded moldable material 106.

FIG. 7 shows a body 710. In the example of FIG. 7, no ruffle formation structure is attached to the body 710. However, any of the ruffle formation structures 130, 330, 430, 530, 630 may be attached to the body 710.

The body 710 is an example of another implementation of the body 110 (FIGS. 1A-1C, 2A, and 2B). The body 710 is the same as the body 110, except the body 710 includes extrusion openings 718 instead of the extrusion opening 118. The extrusion openings 718 are two separate extrusion openings that pass through the body 710 and allow moldable material within the body 710 to be extruded. The extrusion openings 718 have a perimeter in the y-z plane that is defined by curved segments. The shape of the extrusion openings 718 produces two strips of extruded moldable material that each have a cross-section in the y-z plane that is substantially the same as the respective extrusion opening.

FIGS. 8A-8D show various aspects of another ruffle formation apparatus 800 and body 810. FIG. 8A is a block diagram of the body 810 and a mounting structure 852 on an exterior surface of the body 810. FIG. 8B is a block diagram of a ruffle formation assembly 854. FIG. 8C is a block diagram of the ruffle formation apparatus 800 assembled by attaching ruffle formation assembly 854 to the mounting structure 852. FIG. 8D is a side block diagram of the assembled ruffle formation apparatus 800. The ruffle formation assembly 854 may be repeatedly mounted to and removed from the mounting structure 852 without damaging the mounting structure 852 or the ruffle formation assembly 854. This allows the body 810 to be used with different ruffle formation assemblies and increases the play value of the ruffle formation apparatus 800.

Referring to FIG. 8A, the body 810 includes an opening 850 formed in the exterior surface 812. The opening 850 passes through the body 810 and allows moldable material that is within the body 810 to exit. The mounting structure 852 includes two rails or tracks 851a, 851b that are separated from each other in the z direction and are on opposite sides of the opening 850.

FIG. 8B is a block diagram of the ruffle formation assembly 854 in the y-z plane. As shown in FIG. 8C, the ruffle formation assembly 854 may be mounted onto the tracks 851a, 851b to attach the assembly 854 to the body 810. The ruffle formation assembly 854 includes a ruffle formation structure 830 that is attached to a blocking plate 853. The blocking plate 853 is made of a solid, rigid material such as molded plastic. The blocking plate 853 defines an extrusion opening 818 that passes through the blocking plate 853 in the -x direction. The ruffle formation structure 830 is similar to any of the ruffle formation structures 130, 330, 430, 530, 630 discussed above. One portion or edge of the ruffle formation structure 830 is attached to the blocking plate 853.

Referring to FIGS. 8C and 8D, the assembly 854 is mounted between the tracks 851a, 851b. The blocking plate 853 is placed over the opening 850 (FIG. 8A) such that moldable material in the interior of the body 810 may be extruded through the extrusion opening 818 of the assembly 854. The ruffle formation structure 830 is positioned over part of the extrusion opening 818 due to the arrangement of the ruffle formation structure 830 and the extrusion opening 818 on the assembly 854.

The configuration shown in FIGS. 8A-8C allows the user to easily change among many different assemblies that have different ruffle formation structures and/or different extrusion openings. The spatial properties of the ruffled moldable material 107 may thus be changed easily.

Figure 9:
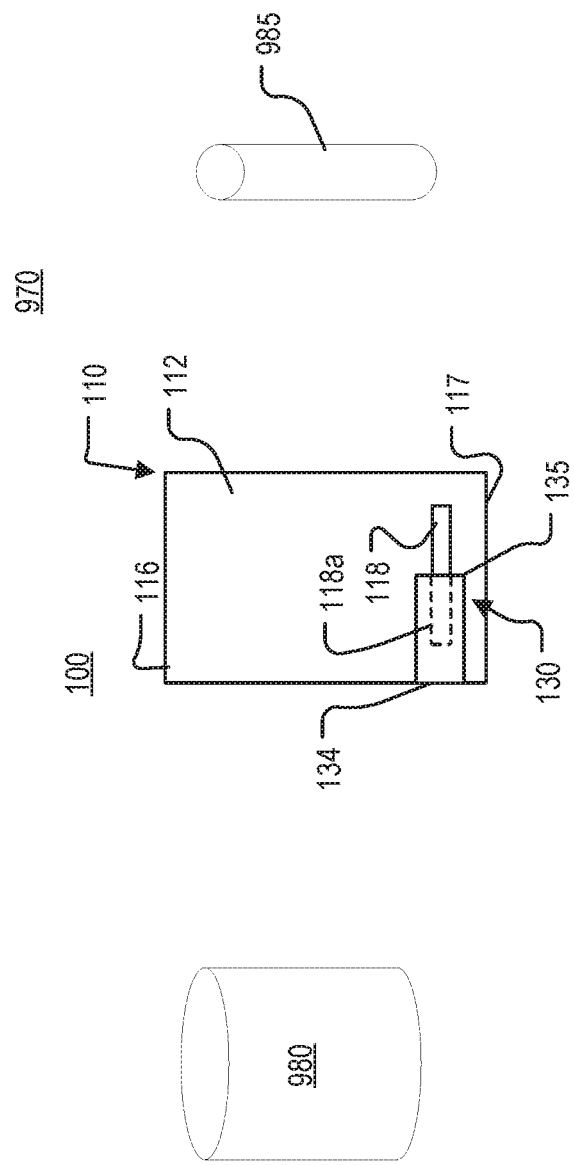
FIG. 9 is a block diagram of an example toy set.

FIG. 9 is a block diagram of an example of a toy set 970 that includes the ruffle formation apparatus 100. The toy set 970 also includes a canister 980 that includes moldable material and a pressing device 985. In this example, the pressing device 985 is a rod made out of a solid material, such as a rigid plastic or metal. The user removes the moldable material from the canister 980 and loads the moldable material into the passage 114. The user then applies force to the moldable material in the -z direction to cause the moldable material to be extruded through the extrusion opening 118.

Other implementations are within the scope of the claims. For example, the passage 114 is illustrated as being L-shaped in the x-y plane (FIG. 1B). However, other implementations are possible. For example, the passage 114 may pass through the body 110 in the x direction without making any turns.

The toy set 970 may include a pressing device 985 other than the rod illustrated in FIG. 9. For example, the pressing device 985 may be an object (such as a crank that drives a moving shaft) that is configured to apply pressure to the moldable material within the body 110 but is permanently mounted to the body 110.

In the examples discussed above, only one edge of each of the ruffle formation structures 130, 330, 430, 530, 630 is attached to a respective body. However, more than one edge may be attached. For example, any of the ruffle formation structures may be formed from more than one separate piece of a material capable of pressing against the moldable material. In these implementations, more than one piece may be attached to the respective body. For example, a ruffle formation structure may be formed from two pieces of a flexible plastic material that cover opposite ends of an extrusion opening. In this example, one edge of each piece may be attached to a housing such that the extruded moldable material interacts with the unattached edges of both pieces.

Moreover, other configurations of the ruffle formation structure are possible. FIGS. 10-13 show, respectively, second sides 1033, 1133, 1233, 1333 of ruffle formation structures 1030, 1130, 1230, 1330. The ruffle formation structure 1030 includes a first edge 1034 that is mounted to a body such as the body 110. The first edge 1034 may be mounted to the body 110 along the y direction of FIG. 1. The ruffle formation structure 1030 includes a second edge 1035 and a third edge that are not mounted to the body 110. The second edge 1035 is curved and the first and third edges 1035, 1036 are linear. The ruffle formation structure 1030 is positioned over part of the extrusion opening 118. An interaction between the extruded moldable material 106 and a first side, the second edge 1035, and/or the third edge 1036 forms the ruffled moldable material 107. The first side (not shown) is opposite the second side 1033. The ruffle formation structure 1030 may rotate about the first edge 1034.

Referring to FIG. 11, the ruffle formation structure 1130 includes the second side 1133, a first edge 1134, and a second edge 1135. The first edge 1134 is mounted to a body such as the body 110. For example, the first edge 1134 may be mounted to the body 110 along the z direction of FIG. 1. The second edge 1135 is a curve that extends from one end of the first edge 1034 to the other end. The second edge 1135 is not mounted to the body 110. The ruffle formation structure 1130 is positioned over part of the extrusion opening 118. An interaction between the extruded moldable material 106 and a first side (not shown), the second edge 1035, and/or the third edge 1036 forms the ruffled moldable material 107. The first side (not shown) is opposite the second side 1133. The ruffle formation structure 1130 may rotate about the first edge 1134.

Figure 12:
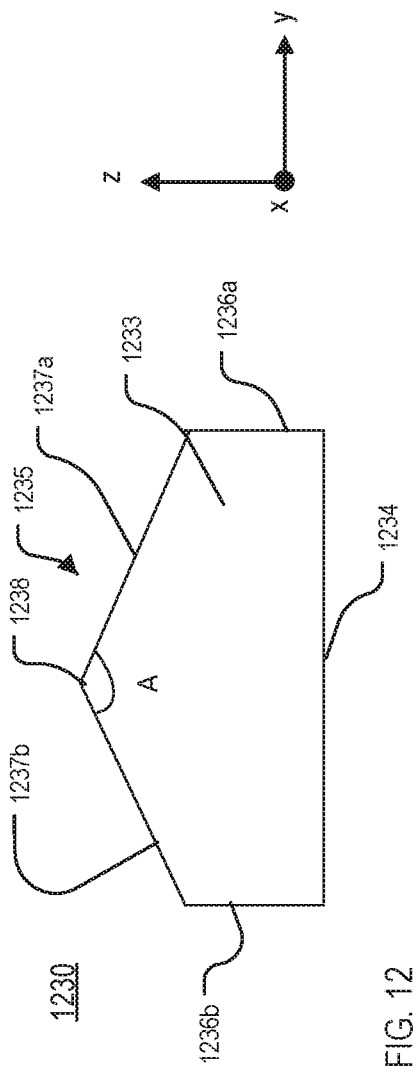

Referring to FIG. 12, the ruffle formation structure 1230 includes the second side 1233, a first edge 1234, a second edge 1235, a third edge 1236a, and a fourth edge 1236b. The first edge 1234 is mounted to a body such as the body 110. For example, the first edge 1234 may be mounted to the body 110 along the y direction of FIG. 1. The second edge 1235 includes two linear segments 1237a, 1237b that meet at a point 1238. The linear segment 1237a extends from the third edge 1236a, and the linear segment 1237b extends from the fourth edge 1236b. The linear segments 1237a, 1237b form an angle A at the point 1238. The angle A is an obtuse angle and is greater than 90 degrees. The second edge 1235, the third edge 1236a, and the fourth edge 1236b, are not mounted to the body 110. The ruffle formation structure 1230 is positioned over part of the extrusion opening 118. An interaction between the extruded moldable material 106 and a first side, the second edge 1235, the third edge 1236a, and/or the fourth edge 1236b forms the ruffled moldable material 107. The first side (not shown) is opposite the second side 1233. The ruffle formation structure 1230 may rotate about the first edge 1234.

Figure 13:
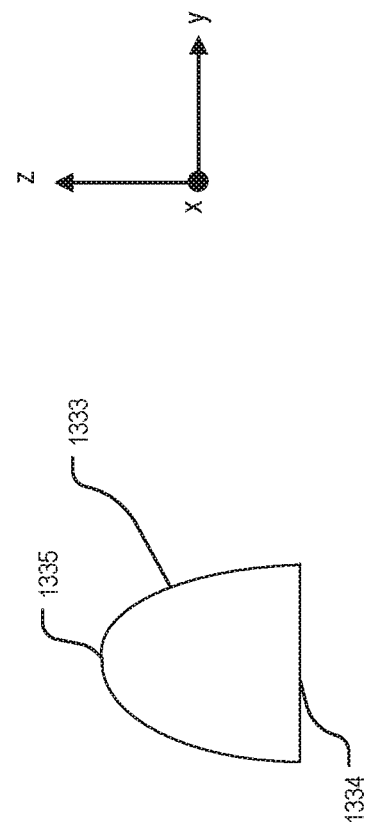

Referring to FIG. 13, the ruffle formation structure 1330 includes the second side 1333, a first edge 1334, and a second edge 1335. The ruffle formation structure 1330 is similar to the ruffle formation structure 1130 (FIG. 11), except the first edge 1334 of the ruffle formation structure 1330 is mounted to the body along the y direction. An interaction between the extruded moldable material 106 and a first side and/or the second edge 1335 forms the ruffled moldable material 107. The first side (not shown) is opposite the second side 1333. The ruffle formation structure 1330 may rotate about the first edge 1334.

Figure 14A:
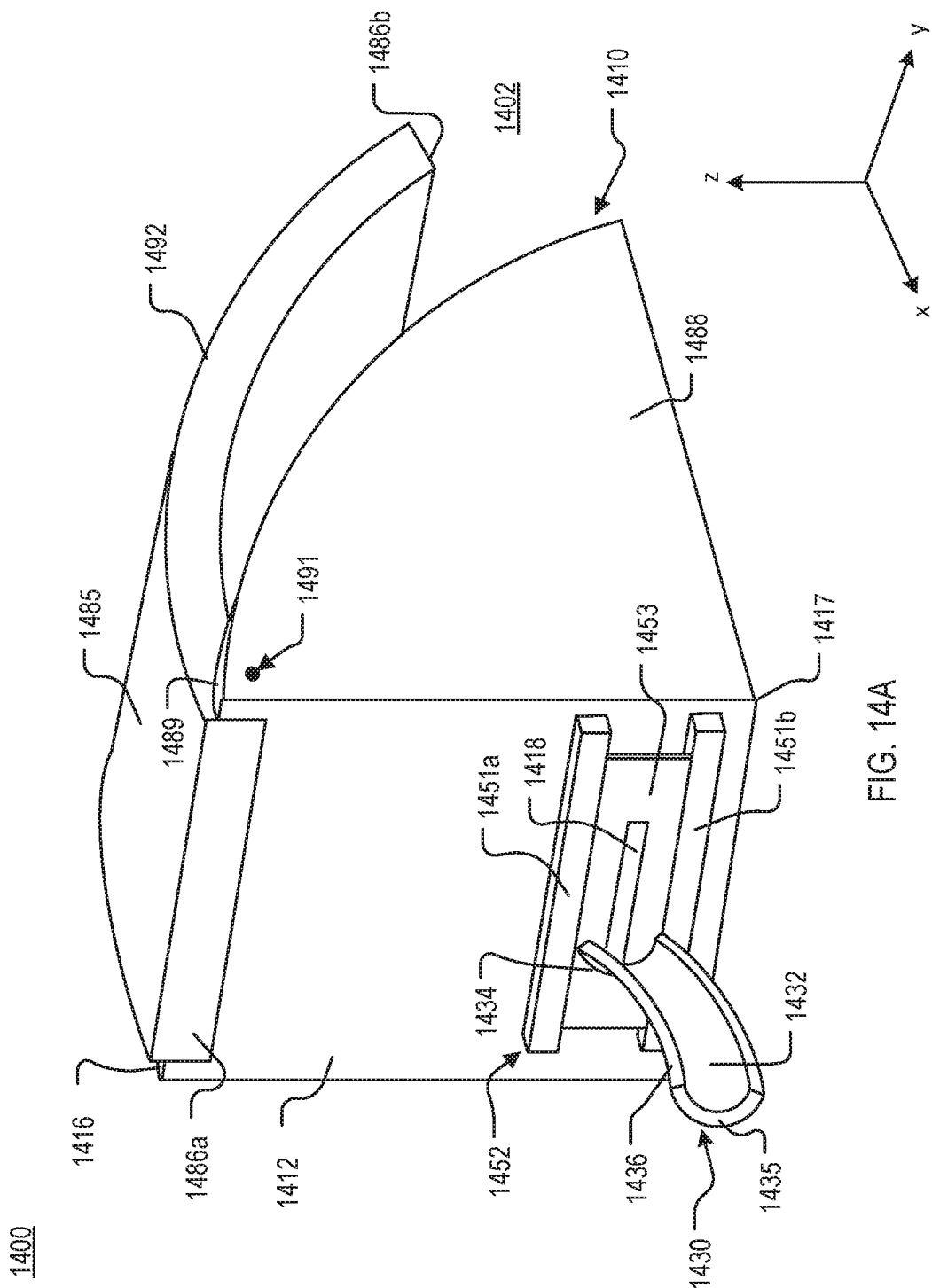
FIG. 14A is a perspective view of another example of a ruffle formation apparatus.

Referring to FIGS. 14A-14F, various aspects of another ruffle formation apparatus 1400 are shown. The ruffle formation apparatus 1400 includes a ruffle formation structure 1430. FIG. 14A is a perspective block diagram of the ruffle formation apparatus 1400. FIG. 14B is a front view of the assembled ruffle formation apparatus 1400. FIG. 14C is a perspective view of the ruffle formation structure 1430. FIG. 14D is a top view of the ruffle formation structure 1430. FIG. 14E is a side block diagram of the ruffle formation apparatus 1400. FIG. 14F is a top view of the ruffle formation apparatus 1400.

The ruffle formation apparatus 1400 includes a body 1410, a mounting structure 1452 on a front exterior surface 1412 of the body 1410, a pressing device 1485, and the ruffle formation structure 1430. The body 1410 includes the front exterior surface 1412, two side exterior surfaces 1488, a top exterior surface 1489, and a passage 1414 (FIG. 14F) that passes through the body 1410. The passage 1414 extends from an opening 1490 in the top exterior surface 1489 to an extrusion opening 1419 (FIG. 14F) in the front exterior surface 1412. The front exterior surface 1412 is generally rectangular and extends in the Y-Z plane. The front exterior surface 1412 has a first end 1416 and a second end 1417. The side exterior surfaces 1488 are connected to the front exterior surface 1412, extend in the X-Z plane, and are separated from each other along the Y direction. The top exterior surface 1489 is between the side exterior surfaces 1488. The outer edge of the top exterior surface 1489 is an arc.

The pressing device 1485 extends along an arc from a first end 1486a to a second end 1486b. The first end 1486a is connected to the body 1410 at a pivot point 1491, which is at the end 1416 of the front exterior side 1412. The pivot point 1491 may be, for example, a pin, axle, or hinge about which the pressing device 1485 is able to rotate. The pressing device 1485 also includes a pressing block 1487 (FIG. 14F). When the pressing device 1485 is pivoted about the pivot point 1491 toward the top exterior surface 1489, the pressing block 1487 enters the opening 1490 and moves into the passage 1414. As shown in FIG. 14A and FIG. 14E, the pressing device 1485 has a generally arced shaped edge 1492. When the pressing device 1485 is at one end of the range of motion of the pivot point 1491, the block 1487 is in the passage 1414 and the pressing device 1485 is substantially flush with the top of the exterior surfaces 1488 or rests on top of the exterior surfaces 1488.

The mounting structure 1452 includes a plate 1453, which is flush with the front exterior surface 1412. The plate 1453 includes a slot or opening 1418 that passes through the plate 1453. The slot or opening 1418 is positioned over the extrusion opening 1419 in the front exterior surface 1412. Thus, the passage 1414 is open to an exterior 1402 environment at the opening 1490 and at the slot 1418.

In the example shown, the plate 1453 is mounted between rails or tracks 1451a and 1451b, which are mounted on or are part of the front exterior surface 1412. The plate 1453 may be permanently affixed to the rails 1451a and 1451b, for example, with glue or another adhesive. In some implementations, the plate 1453 may be attached to and removed from the rails 1451a and 1451b without damaging the plate 1453 or the rails 1451a, 1451b. For example, the rails 1451a and 1451b may each include a slot that receives one side of the plate 1453 such that the plate 1453 may be slid onto or off of the rails 1451a and 1451b. Moreover, the ruffle formation apparatus 1400 may be implemented without the rails 1451a and 1451b. For example, the plate 1453 may be directly affixed to the front exterior surface 1412 with, for example, an adhesive.

The ruffle formation structure 1430 is a curved structure that extends along an arc 1493 (as shown in FIG. 14D) from an end 1434 to an end 1435. The ruffle formation structure 1430 includes a curved wall 1432 with an edge 1436. The curved wall 1432 and the edge 1436 extend along the arc 1493 from the end 1434 to the end 1435. The curved wall 1432 has a curved cross-section in the Y-Z plane, as shown in FIG. 14B. The cross-section of the curved wall 1432 is a half-circle in the example shown in FIGS. 14A-14E. However, other curved shapes may be used.

The end 1434 is attached to the plate 1453. The ruffle formation structure 1430 extends outward from the plate 1453. The curved structure 1430 partially covers the slot 1418 such that, when the front exterior surface 1412 is viewed from the front (such as shown in FIG. 14B), the curved structure 1430 obscures a portion of the slot 1418 from view.

In use, an operator of the apparatus 1400 places the moldable material 106 into the opening 1490 so that there is moldable material 106 in the passage 1414. The user then presses the pressing device 1485 toward the passage 1414 so that the pressing block 1487 enters the passage 1414. The pressing block 1487 makes physical contact with the moldable material 106, thereby applying pressure to the moldable material 106. The pressure causes the moldable material 106 to be extruded through the slot 1418. The extruded moldable material then interacts with the curved wall 1432 because the curved structure 1430 obscures the slot 1418. The interaction between the curved wall 1432 and the extruded moldable material causes the extruded moldable material to bunch and gather, and a ruffled moldable material is formed.

The ruffle formation structure 1430 may be made of any durable, rigid, solid material. For example, the ruffle formation structure 1430 may be made of a molded plastic. The ruffle formation structure 1430 is a rigid object that does not move independently of the plate 1453 or the front exterior wall 1412. In other words, the ruffle formation structure 1430 and the curved wall 1432 do not move in response to receiving the extruded moldable material from the slot 1418. The curved wall 1432 may be smooth or may have a surface texture (for example, a roughened surface) that encourages bunching and ruffle formation.

Figure 15A:
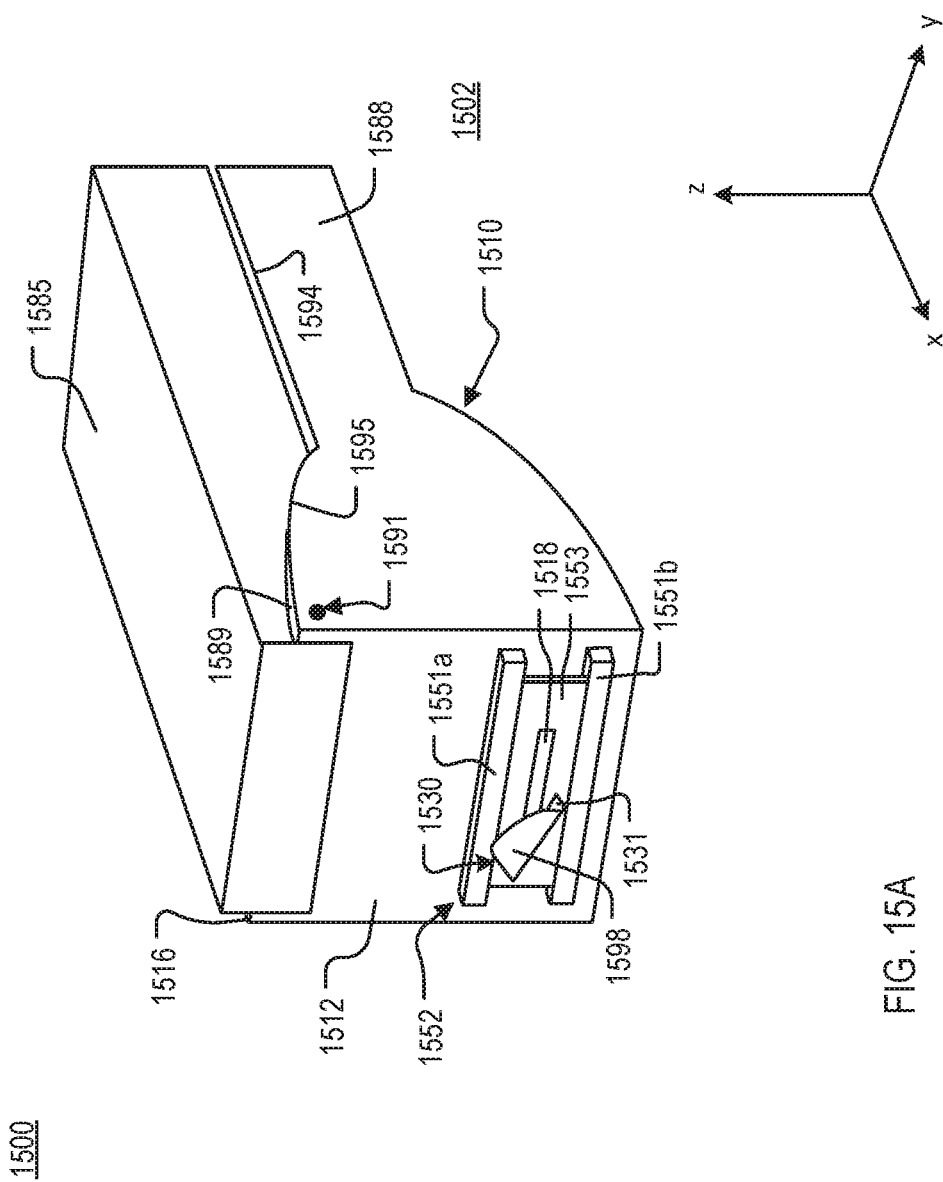
FIG. 15A is a perspective view of an example of another ruffle formation apparatus.
Figure 15C:
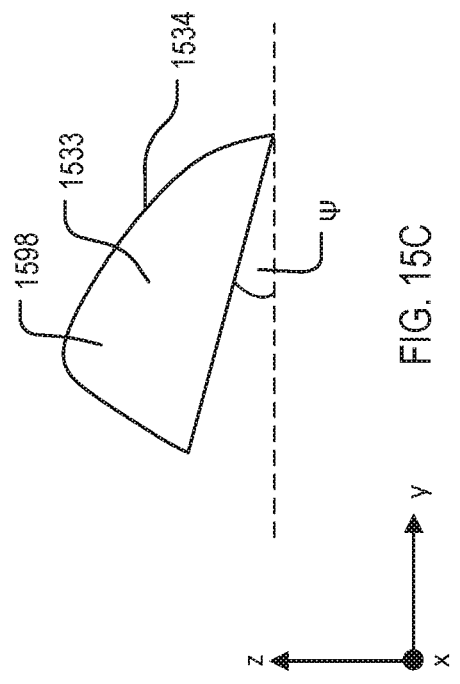
FIG. 15C is a front view of a ruffle formation structure.
Figure 15D:
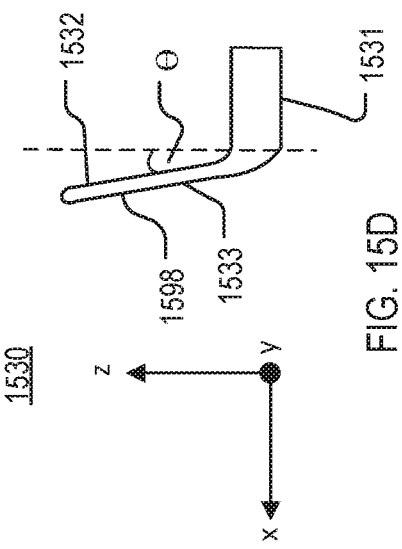
FIG. 15D is a side view of the ruffle formation structure of FIG. 15C.
Figure 15B:
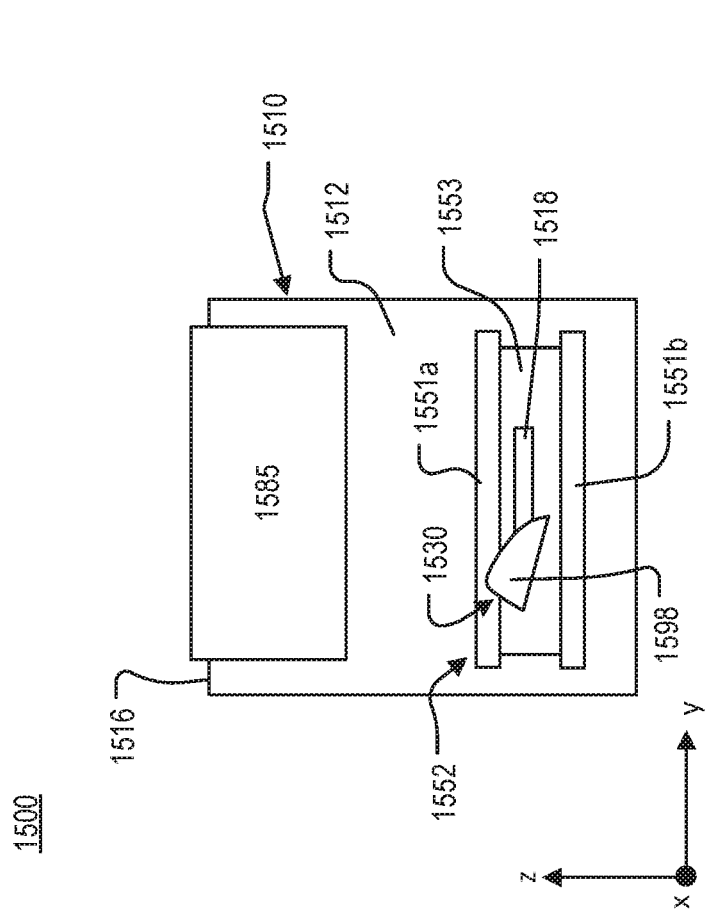
FIG. 15B is a front view of the ruffle formation apparatus of FIG. 15A.
Figure 15E:
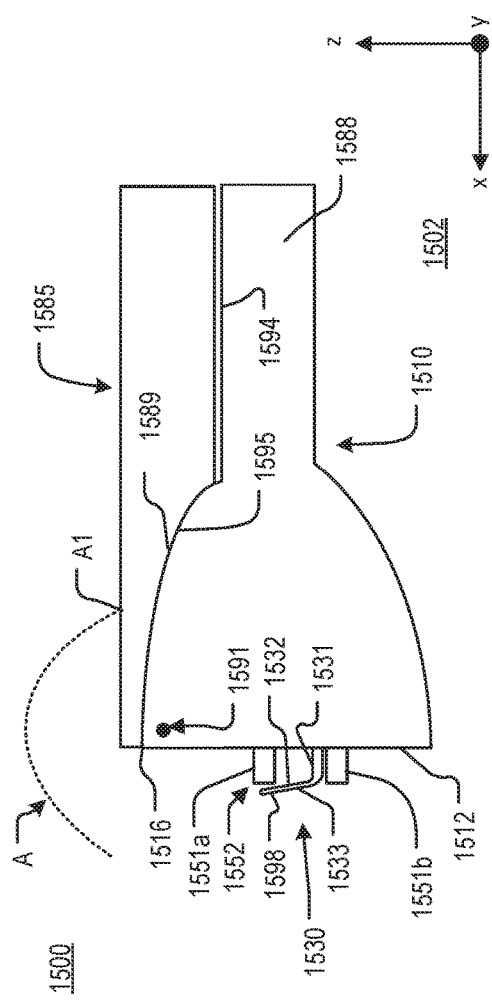
FIGS. 15E and 15F are side views of the ruffle formation apparatus of FIG. 15A.
Figure 15F:
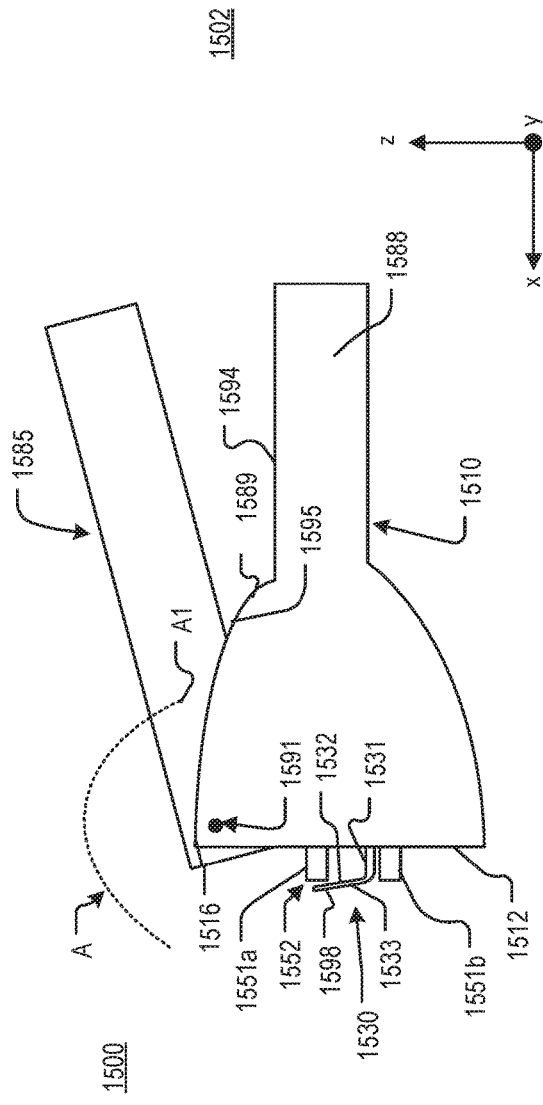

Referring to FIGS. 15A-15G, various aspects of another ruffle formation apparatus 1500 are shown. The ruffle formation apparatus 1500 includes a ruffle formation structure 1530. FIG. 15A is a perspective view of the ruffle formation apparatus 1500. FIG. 15B is a front view of the assembled ruffle formation apparatus 1500. FIG. 15C is a front view of the ruffle formation structure 1530. FIG. 15D is a side view of the ruffle formation structure 1530. FIG. 15E is a side block diagram of the ruffle formation apparatus 1500. FIG. 15F is another side block diagram of the ruffle formation apparatus 1500. FIG. 15G is a top view of the ruffle formation apparatus 1500.

The ruffle formation apparatus 1500 includes a body 1510, a mounting structure 1552 on a front exterior surface 1512 of the body 1510, a pressing device 1585, and a ruffle formation structure 1530. The body 1510 includes the front exterior surface 1512, two side exterior surfaces 1588, a top exterior surface 1589, and a passage 1514 (FIG. 15F) that passes through the body 1510. The passage 1514 extends from an opening 1590 in the top exterior surface 1589 to an extrusion opening 1519 (FIG. 15F) in the front exterior surface 1512. The top exterior surface 1589 includes a curved portion 1595 and a linear portion 1594.

The pressing device 1585 is connected to a pivot point 1591, which is at an end 1516 of the front exterior surface 1512. The pivot point 1591 may be, for example, a pin, axel, or hinge. The pressing device 1585 is able to move about the pivot point 1591 through an arc A (FIGS. 15E and 15F). The pressing device 1585 also includes a pressing block 1587, which is shown in FIG. 15G. When the pressing device 1585 is at a first end µl of the arc A, the pressing device 1585 is completely closed and rests on the curved portion 1595 and the linear portion 1594 of the body 1510.

The ruffle formation apparatus 1500 also includes a mounting structure 1552. The mounting structure 1552 includes a plate 1553, which is flush with the front exterior surface 1512. The plate 1553 includes a slot or opening 1518 that passes through the plate 1553. The slot or opening 1518 is positioned over the extrusion opening 1519 in the front exterior surface 1512. Thus, the passage 1514 is open to an exterior environment 1502 at the opening 1590 and at the slot 1518.

In the example shown, the plate 1553 is mounted between rails or tracks 1551a and 1551b, which are mounted on or are part of the front exterior surface 1512. The plate 1553 may be permanently affixed to the rails 1551a and 1551b, for example, with glue or another adhesive. In some implementations, the plate 1553 may be attached to and removed from the rails 1551a and 1551b without damaging the plate 1553 or the rails 1551a, 1551b. For example, the rails 1551a and 1551b may each include a slot that receives one side of the plate 1553 such that the plate 1553 may be slid onto or off of the rails 1551a and 1551b. Moreover, the ruffle formation apparatus 1500 may be implemented without the rails 1551a and 1551b. For example, the plate 1553 may be directly affixed to the front exterior surface 1512 with, for example, an adhesive.

The ruffle formation structure 1530 is a three-dimensional structure that includes a base 1531 and a lip 1598 that curves upward from the base 1531. The ruffle formation structure 1530 also includes a first side 1532 and a second side 1533, which is opposite the first side 1532. The shape of the lip 1598 is defined by an edge 1534, which is curved (as shown in FIG. 15C). The base 1531 is attached to the plate 1553 at an angle Ψ relative to the Y axis, as shown in FIG. 15C. The angle Ψ may be, for example, 5 to 30 degrees (°). The base 1531 extends outward from the plate 1553 and the lip 1598 curves upward from the base 1531 at an angle Θ relative to the Z axis, as shown in FIG. 15D. The angle Θ may be, for example, 5° to 20°. The ruffle formation structure 1530 partially covers the slot 1518 such that, when the front exterior surface 1512 is viewed from the front (such as shown in FIG. 15B), the ruffle formation structure 1530 obscures a portion of the slot 1518 from view.

In operational use, the ruffle formation apparatus 1500 is used to form a ruffled moldable material. The user places the moldable material 106 into the passage 1514. The pressing device 1585 is moved along the arc A toward the passage 1514 so that the pressing block 1587 enters the passage 1514. The pressing block 1587 makes physical contact with the moldable material 106 that is placed into the passage 1514. In this way, pressure is applied to the moldable material 106 causing the moldable material 106 to be extruded through the slot 1518. An interaction between the extruded moldable material 106, the first side 1532, and a portion of the edge 1534 or all of the edge 1534 forms the ruffled moldable material 107. The base 1531 and the lip 1598 are made of a rigid material such as, for example, a molded plastic or metal. The base 1531 and the lip 1598 do not move relative to the plate 1553 while interacting with the extruded moldable material.

The configurations discussed are examples. Other configurations are also possible.

What is claimed is:

1. An apparatus for forming a ruffled moldable material, the apparatus comprising:
    a body comprising an interior space and an extrusion opening that passes through from the interior space to an exterior of the body; and
    a ruffle formation structure that at least partially covers the extrusion opening, the ruffle formation structure comprising:
        a first side;
        a second side opposite the first side;
        a first edge attached to the body; and a second edge, wherein, in operational use, extruded moldable material is emitted from the extrusion opening along an extrusion direction, and the extruded moldable material interacts with the ruffle formation structure to form the ruffled moldable material by compressing at least some of the extruded moldable material along the extrusion direction.

2. The apparatus of claim 1, wherein, in operational use, the extruded moldable material interacts with the second edge and the first side of the ruffle formation structure.

3. The apparatus of claim 1, wherein the second edge of the ruffle formation structure moves relative to the extrusion opening when the extruded moldable material interacts with the second edge of the ruffle formation structure.

4. The apparatus of claim 3, wherein the second edge of the ruffle formation structure moves toward and away from the extrusion opening.

5. The apparatus of claim 1, wherein the ruffle formation structure comprises a solid material that is flexible.

6. The apparatus of claim 1, wherein the ruffle formation structure comprises a solid material that is rigid and does not move relative to the body.

7. The apparatus of claim 1, wherein the second edge defines a path that includes more than one linear segment.

8. The apparatus of claim 7, wherein the path includes two connected linear segments that meet at a point along the path and define an angle at the point.

9. The apparatus of claim 8, wherein the ruffle formation structure further comprises a third edge and a fourth edge, the first edge and the second edge extend between the third edge and the fourth edge.

10. The apparatus of claim 9, wherein the point along the path is midway between the third edge and the fourth edge.

11. The apparatus of claim 8, wherein the angle is an acute angle.

12. The apparatus of claim 1, wherein the second edge defines a path that includes at least one segment that is non-linear.

13. The apparatus of claim 1, further comprising a pressing device configured to apply pressure to moldable material received in the interior space.

14. The apparatus of claim 1, wherein the first edge is attached to the body such that a space is between the extrusion opening and the first side of the ruffle formation structure.

15. The apparatus of claim 1, wherein the second edge of the ruffle formation structure is further configured to carve or scrape the extruded moldable material.

16. The apparatus of claim 1, wherein the second edge is opposite the first edge.

17. The apparatus of claim 1, wherein the ruffled moldable material is formed without moving the body.

18. The apparatus of claim 1, wherein the extrusion opening extends in a first plane, the first edge that is attached to the body extends in a second plane that is substantially parallel to the first plane, and the extrusion direction is perpendicular to the first plane.

19. A method of forming a ruffled moldable material, the method comprising:
   extruding a moldable material from an extrusion opening along an extrusion direction to form an extruded moldable material, the extruded moldable material having a first geometric distribution and a first extent along the extrusion direction; and
   forming the ruffled moldable material by interacting the extruded moldable material with a ruffle formation structure, the interaction comprising: pressing the extruded moldable material into a first side of the ruffle formation structure attached at a first edge to a body that defines the extrusion opening such that the extruded moldable material makes physical contact with a second edge of the ruffle formation structure while moving relative to the second edge to thereby form the ruffled moldable material, the ruffled moldable material having a second geometric distribution that comprises substantially the same amount of moldable material as the first geometric distribution and a smaller extent a smaller extent in the extrusion direction.

20. A ruffle formation apparatus for use with a toy moldable compound, the apparatus comprising:
   a body comprising an extrusion opening that passes from an interior of the body to an exterior of the body; and
   a ruffle formation structure attached to the exterior of the body and partially covering the extrusion opening.

* * * * *